Feb. 8, 1966   J. E. BROWN   3,233,340
TEACHING AND GAME MACHINE
Filed July 2, 1963   3 Sheets-Sheet 1

INVENTOR.
JAMES E. BROWN
BY Cumpston & Shaw
ATTORNEYS

INVENTOR.
JAMES E. BROWN

Feb. 8, 1966    J. E. BROWN    3,233,340
TEACHING AND GAME MACHINE
Filed July 2, 1963    3 Sheets-Sheet 3

INVENTOR.
JAMES E. BROWN
BY
*Cumpston Shaw*
ATTORNEYS

# 3,233,340
Patented Feb. 8, 1966

3,233,340
TEACHING AND GAME MACHINE
James E. Brown, 261 Linden St., Avon, N.Y.
Filed July 2, 1963, Ser. No. 292,320
8 Claims. (Cl. 35—9)

This invention relates to a teaching machine. More particularly, the invention relates to a device for teaching to a student the strategy and tactics of a playing card game such as, for example, contract bridge.

Teaching machines have been made in the past and are now available for teaching to a student a wide variety of information, including games of many kinds. For example, there is a readily available machine that can be used for teaching the play of contract bridge, but it has the unfortunate disadvantage that when a student selects a card out of its proper turn and thus makes an incorrect play, the information furnished by the machine is not limited to the fact that the card played is incorrect, but the machine also reveals the proper order of play for that particular card. This is unfortunate, since the student cannot help but observe this revealed information and, however unwillingly, recall and be guided by it during subsequent plays.

One object of the present invention is to provide a new and improved teaching machine of general utility.

Another object of the invention is to provide a teaching machine that is versatile and that can be used, with improved results, for teaching in a variety of fields.

Still another object of the invention is to provide a new and practical teaching machine that is inexpensive to construct, easy to use, and that is particularly well adapted for instructing a student in the strategy and tactics of card games.

A further object of the invention is to provide a new and improved teaching machine that can be programmed to confront a student with a question, that will permit the student to make a selection from several available answers, and that will then permit the student to determine whether the selected answer is right or wrong, without informing the student of any relationship between an answer that has been selected, and that is wrong, and any other of the questions in the program.

A more specific object of the invention is to provide a machine for teaching the strategy and tactics of contract bridge, and that will continuously challenge the student with each play of the cards.

A further object of the invention is to provide a new and improved recorded program for a teaching machine.

A related object of the invention is to provide a practical program sheet for a teaching machine, that has a program recorded thereon in such a way as to avoid revealing information upon inspection and observation of the program sheet alone.

Still another object of the invention is to provide a simple, practical teaching machine, and a new and practical program sheet for use in the machine, that teach efficiently and easily and that do not give the student information that is unrelated to an immediate question or requirement for the selection of a choice of answers.

Other objects of the invention will be apparent hereinafter from the specification and from the recital of the appended claims. To these and other ends, the invention resides in certain improvements and combinations of parts, all as will hereinafter be more fully described, the novel features being pointed out in the claims at the end of this specification.

In the drawings:

FIG. 1 is a top plan view of a device that is constructed in accordance with one preferred embodiment of this invention, and that consists of a teaching machine with a program sheet inserted in the machine ready for use, for the teaching of the strategy and tactics of contract bridge, and showing the position of the machine after the initial bidding has been completed and the first four cards have been "played" by a student operating the machine;

Figure 1:
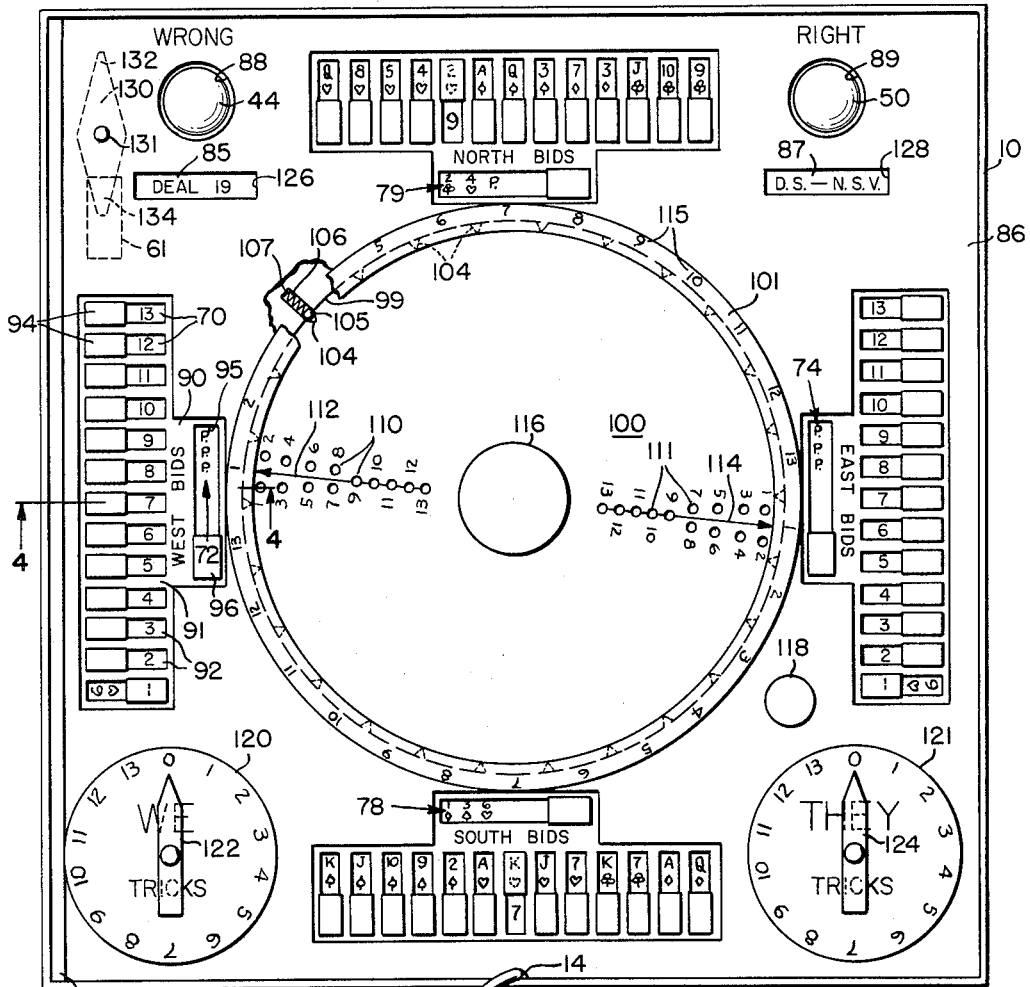

The preferred embodiment of a teaching machine, for teaching the strategy and tactics of contract bridge to a student, that is illustrated in the drawings, is shown by way of illustration only. Referring now to the drawings in detail by numerals of reference, the teaching machine is housed in the lower half of a box 10, the top for which is not shown. The machine comprises a base 11 that is made from heavy cardboard stock, for example, cut substantially to the same size as the interior of the box, and that is supported on partitions 13 within the box, so that it is disposed in a horizontal position, parallel to the bottom of the box.

The base 11 is formed with a cut-out notch 12, that is sufficiently large to permit the insertion of a finger therein, along one of its edges. The base is also formed with a small, rounded notch 14, of sufficient size to permit a wire to be led out through the notch between the base and the confronting wall of the box. The base is also formed with a pair of circular openings 15 and 16 adjacent its opposite, upper corners, relative to FIG. 2.

Figure 2:
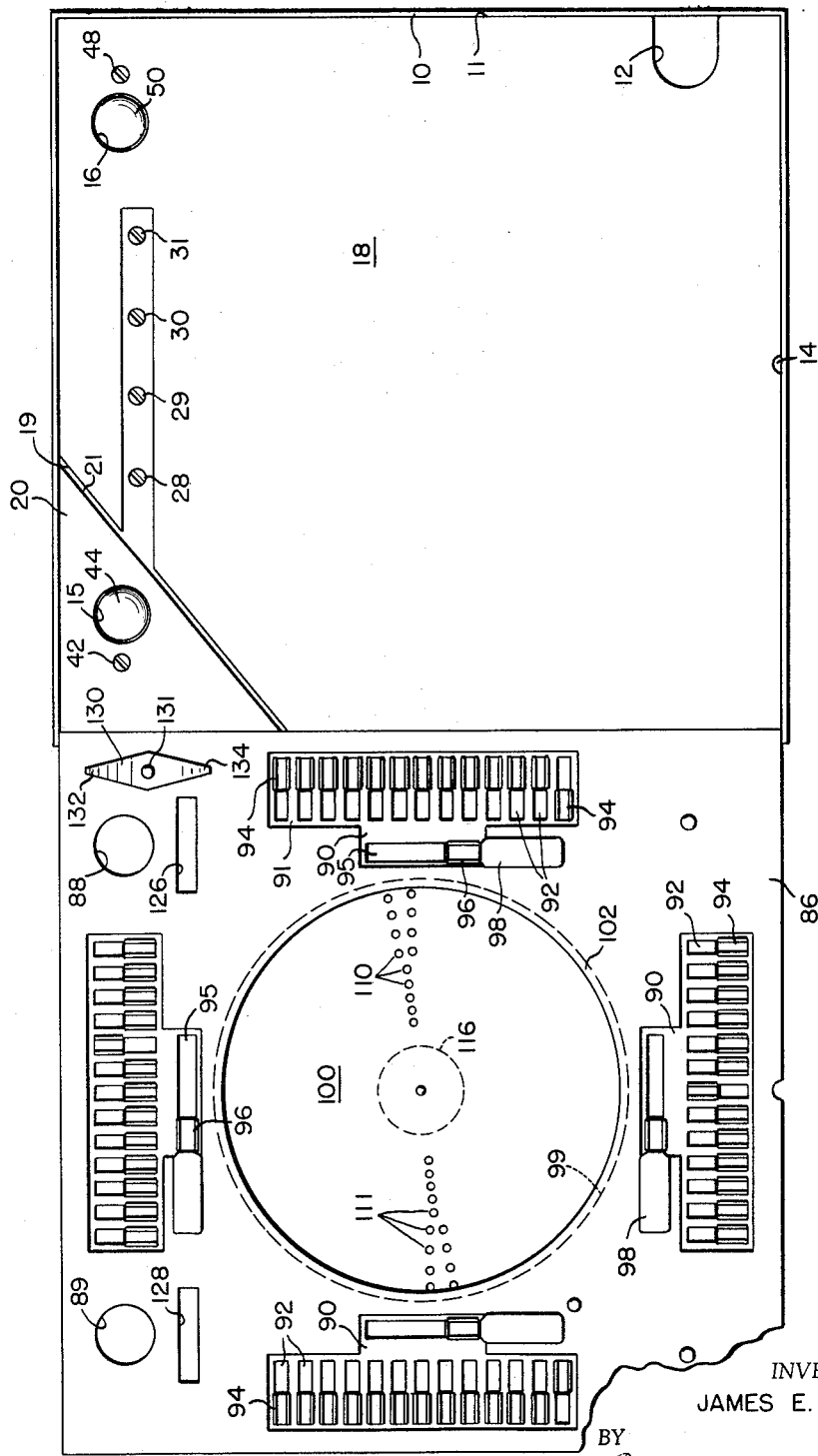
FIG. 2 is a top plan view thereof, on a reduced scale, with the cover of the machine opened, with the program sheet removed, and with the probe and its cord not shown.

A conductive layer 18 of metallic foil or the like is disposed over a major portion of the upper surface of the base 11, and conforms in shape to the shape of the base, as can best be seen in FIG. 2. Still referring to FIG. 2, at the upper left hand corner of the base, the conductive layer 18 is terminated along the diagonal line 19, and a second, separate, generally triangular conductive layer 20, that is terminated along a diagonal line 21 that is spaced from the line 19, is disposed over the remaining surface of the base. The conductive layer 20 is electrically insulated from the larger conductive layer 18 by reason of the gap between these two layers, respectively.

Figure 6:
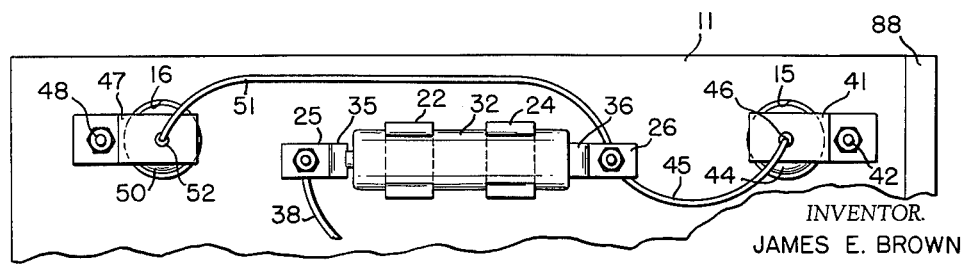
FIG. 6 is a fragmentary bottom plan view showing one end of the base of the machine.

Referring now particularly to FIG. 6, a pair of generally U-shaped clamps 22 and 24, and a pair of resilient contact clips 25 and 26, are hung from the lower surface of the base 11 by four threaded fasteners 28, 29, 30 and 21, respectively. The heads of these four fasteners are exposed on the upper face of the base 11 and the conductive layer 18 is spaced from their heads in order to be electrically insulated from them and in order that they are electrically insulated from each other.

A dry cell 32 is gripped by the clamps 22 and 24, and its electrodes are engaged by and in electrical contact with contact arms 35 and 36 of the clips 25 and 26 respectively. One end of an electrical conductor wire 38 is secured to and in electrical contact with the clip 25. This conductor wire 38 is led out beneath the base 11, through notches 39 in the partitions 13, and out through the notch 14 in the base 11 to the exterior of the box. A probe 40 (FIG. 1) is secured on the free end of the wire 38.

One arm of a socket support bracket 41 is secured to the lower face of the base 11 adjacent the hole 15 by a fastener 42 whose head engages and is in electrical contact with the conductive layer 20 on the upper surface of the base. A socket (not shown) for an electric lamp 44 is mounted on the bracket 41, so that the lamp 44 projects upwardly through the opening 15. One end of an electrical conductor 45 is led through an insulating bushing 46 in the bracket 41, to make electrical contact with one terminal of the lamp socket. Electrical contact with the other terminal of the lamp socket is made in the usual way through the bracket 41 itself. The other end of the conductor 45 is secured to, and is electrically connected to, the clip 26.

A bracket 47 is secured to the base 11 adjacent the opening 16 by an electrically conductive fastener 48. The head of the fastener 48 is engaged against and is in electrical contact with the conductive layer 18 on the upper surface of the base. A socket (not shown) for an electric lamp 50 is mounted on this bracket so that the lamp can project upwardly through the opening 16 in the base. Electrical contact is made with one terminal of the lamp socket in the usual way through the bracket 47 itself. One end of a conductor 51 is led through an insulating bushing 52 in the bracket to make contact with the other socket terminal. The other end of the conductor 51 is connected to and secured to the clip 26.

To test the dry cell 32, the tip of the probe 40 can be engaged against the conductive layer 18, to complete a circuit from the end of the probe 40 through the wire 38, the clip 25, and the arm 35 of the clip, to one terminal of the dry cell; and through the conductive layer 18, the fastener 48, and the bracket 47, through the lamp 50, the line 51, the clip 26, and the arm 36 of the clip, to the opposite terminal of the dry cell 32. If the dry cell 32 is fresh and at operating strength, and if all electrical connections have been properly made, the lamp 50 will be energized and will cast a light that is readily visible. As soon as the tip of the probe 40 is removed from the conductive layer 18, this circuit is broken, and the lamp will go out.

Similarly, the dry cell could be tested by engaging the tip of the probe 40 against the smaller conductive layer 20. This would complete a circuit from the tip of the probe 40 through the line 38, the clip 25, and the arm 35 of the clip, to one terminal of the dry cell, as previously described; and from the conductive layer 20 through the fastener 42, the bracket 47, and the lamp 44, the line 45, the clip 26, and the arm 36 of the clip, to the opposite terminal of the dry cell 32. This energizes the lamp 50. The lamp goes out as soon as the tip of the probe is removed from the conductive layer 20.

Figure 3:
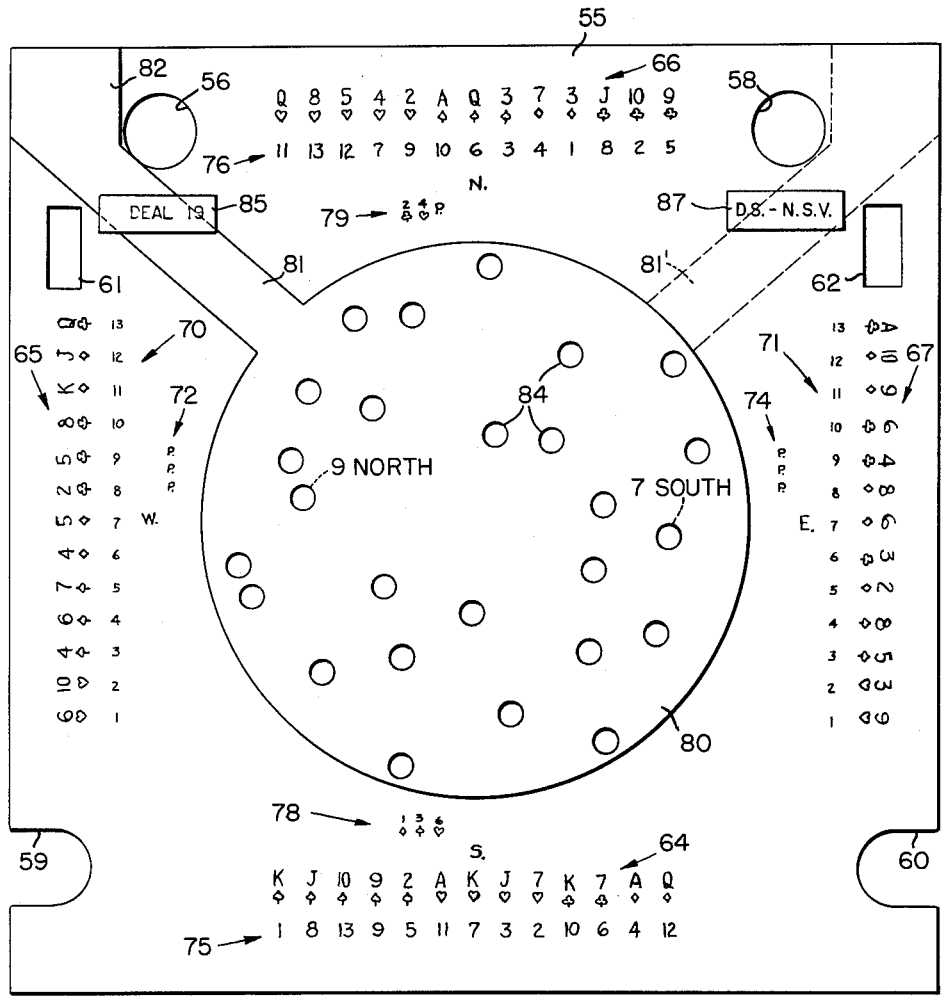
FIG. 3 is a top plan view of one program sheet that is constructed in accordance with a preferred embodiment of this invention, for use in a teaching machine that is constructed in accordance with this invention.

A typical program sheet or card 55, for use in connection with the machine, is illustrated in FIG. 3. The sheet that is illustrated is made with one program on each of its surfaces, so that the sheet is reversible. For simplicity, however, only one side of the sheet need be used.

The program sheet 55 is formed from a sheet of stiff cardboard stock that is cut to substantially the same size as the base 11. The sheet 55 is formed, adjacent its opposite upper corners relative to FIG. 3, with a pair of circular openings 56 and 58, through which the lamps 44 and 50 can project. This sheet is also formed adjacent its lower edge, and at its opposite side margins, with a pair of large recesses 59 and 60 respectively, that correspond in shape to the shape of the recess 12 in the base 11, but that are less deep than the recess 12, to facilitate the removal of a program sheet from the base. The sheet 55 is also formed with a pair of rectangular openings 61 and 62 respectively, that are located adjacent the upper left and right corners of the program sheet relative to FIG. 3. The openings 61 and 62 are positioned in the program sheet so that when the sheet is placed over the base 11 of the machine, for use, one of these openings will be at the location indicated in dashed lines in FIG. 1, to expose through the program sheet an area of the conductive layer 20.

The program sheet 55 is imprinted in four major indicia zones that are denoted respectively and generally by the numerals 64, 65, 66 and 67. These four indicia zones are imprinted, respectively, with indicia representing South, West, North, and East hands for the playing of a game of contract bridge in accordance with a predetermined program of play as determined by an expert in the game.

The playing cards in the West and East hands respectively are arranged in the order in which they should be played in accordance with the program. To this end, the West and East indicia zones 65 and 67 respectively are imprinted with numeral indicia generally indicated by the numerals 70 and 71, respectively, that include the numerals 1 through 13 inclusive in each zone, in numerical order, to depict and identify the order of play for each card in each of these two hands. These zones are also imprinted with indicia 72 and 74, respectively, that indicate in abbreviated form the bidding for each of these two hands in accordance with the program.

The playing cards in the South and North indicia zones 64 and 66 respectively are arranged as they would normally be by a skilled player, in suits, and in order of rank for each suit. A series of code numbers, that are indicated in the drawings by the general numerals 75 and 76, respectively, are imprinted adjacent the card indicia in the South and North hands. These numerals are not arranged in any particular order, but are coded in a way that will be explained presently. Code symbols other than numerals could be used as well as numerals. These indicia zones also include indicia to indicate the programmed bidding for each of these positions, as indicated by the general numerals 78 and 79 respectively.

A circular piece 80 of conductive metallic foil is secured over a central area of the program sheet. This foil is formed with an extension 81 that is directed radially outwardly from the circular piece 80 toward the upper left hand corner on the program sheet, relative to FIG. 3, where it is formed with an enlarged end section 82. The foil extension 81 and its enlarged end section 82 are disposed to extend, on the sheet surface, between the rectangular opening 61 and the circular opening 56 in the program card. The program sheet is also formed with a plurality of holes 84 that extend through the entire thickness of the sheet, from one of its surfaces to the other, to permit the tip of the probe 40 to be inserted therein and to extend therethrough. There are 26 of these holes through the foil piece 80, and the respective positions of these holes are coded and bear a definite relationship to the code indicia, 75 and 76, that are disposed adjacent the several playing cards in the hands in the South and North positions. This relationship will be explained presently.

The program sheet 55 has a small label 85 adhered thereto directly below the opening 56, and overlying a part of the foil extension 81. This label 85 carries indicia to identify the program on that side of the program sheet, to distinguish it from other programs, each of which would consist of a particular arrangement of cards for playing in a particular sequence. The sheet is also imprinted, in a zone that is placed below the opening 58, with indicia indicated by the general numeral 87 and indicating the position of the supposed dealer for the particular program, and whether either side is vulnerable, and any other desired information.

The program sheet 55 is formed with a similar program on its other surface. The only part of the material on the other surface of the program sheet, that is shown in FIG. 3, is the foil extension 81' on that surface of the sheet.

Figures 4, 5:
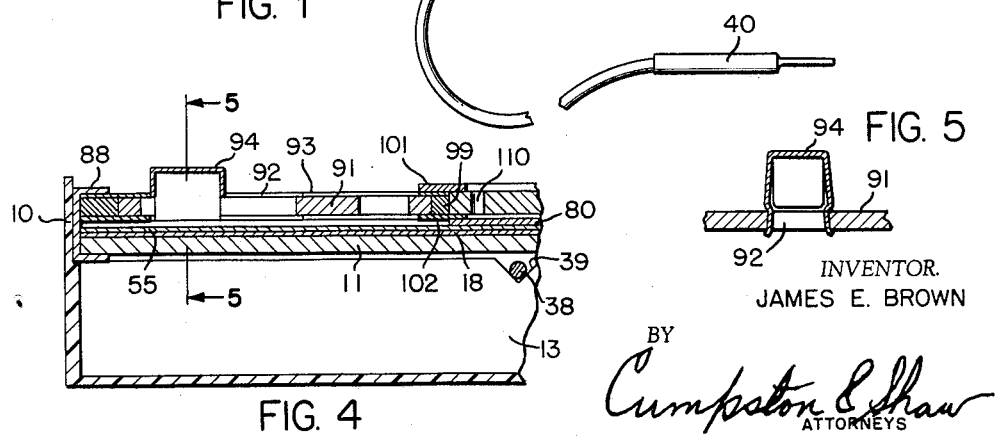
FIG. 4 is a fragmentary section, on an enlarged scale, taken on the line 4—4 of FIG. 1, looking in the direction of the arrows.
FIG. 5 is a fragmentary section taken on the line 5—5 of FIG. 4, looking in the direction of the arrows.

The cover 86 is formed from a stiff, relatively thick piece of sheet material such as, for example, heavy paper stock, cardboard, or molded resinous material. The cover 86 is secured to the base 11, along two of their respective sides, by a hinge member 88 (FIGS. 1 and 4), to permit pivotal movement between these two parts of the machine. The cover 86 is formed with a pair of circular openings 88 and 89 respectively, through which the lamps 44 and 50 project.

The cover is also formed, at each of the four simulated player positions, and in locations to be in registry with the indicia zones respectively of a program sheet that is inserted in the machine, with substantially identical frames whose structure will be described by describing the frame in the West position, which is typical. This frame 90 consists of a metal skeleton 91 that is formed with a plurality of generally rectangular openings 92 that are disposed, respectively, to be in registry with the playing card indicia that are located in the indicia zone 70 on the program card, beneath the cover. There are a plurality of sliders 94 that are mounted in the openings 92 respectively, so that each can slide from one end of its opening to the other. Each slider 94 has a length that is approximately one-half of the length of its opening, so that the slider, depending upon its position, will conceal either the playing card indicia or the numerical indicia that is adjacent the playing card indicia.

In addition, the frame 90 is formed with an elongate, generally rectangular opening 95, that is in registry with the bidding indicia 72. A slider 96 is mounted for movement from one end of this opening 95 to the other, and the slider 96 is formed with a flat extension or tail 98 (FIG. 2) to permit the opening 95 to be closed off in one extreme position of the slider and to be substantially completely open in the other extreme position of the slider.

The cover 86 is also formed with a central circular opening 99. A circular template 100 is disposed in this opening and is held in place by upper and lower retainer rings 101 and 102, respectively, that engage the upper and lower peripheral surfaces of the ring, to retain it in place, while permitting it to be rotated relative to the cover. The lower retainer ring 102 is formed, as shown, as an integral lip of the cover, but may be a separate ring, if desired. The template 100 is formed with 26 notches 104 that are substantially uniformly spaced about its circumference. A ball 105 and spring 106 are disposed in a cylindrical bore 107 in the cover 86, to confront the circumferential edge of the template 100, to permit the ball 105 releasably to engage in any of the notches 104 that are brought into registry with the ball, to provide a ball and detent arrangement for holding the template in preselected positions.

Thirteen numbered holes, that are identified by the general numeral 110, are formed in the template 100 along and about one radius thereof, and a second group of thirteen numbered holes 111 are formed along and about the diametrically opposite radius of the template. These holes are formed at locations that are spaced from each other within each group but that have no particular locations on the template except that each group is symmetrical with the other group so that the two groups of holes can be used interchangeably. The template is imprinted with a pair of arrows 112 and 114, respectively, along the radius lines about which the holes are clustered.

Two groups of numbers 115, each running from 1 through 13 inclusive, are imprinted on the upper surface of the upper retainer ring 101, to cooperate with the arrows 112 and 114. The relative positions of the notches 104, the numbers 115 on the retainer ring, and the arrows 112 and 114 on the template, are such that the ball 105 engages in one of the notches 104 when the arrows are aligned with a pair of the numbers 115, respectively. A knob 116 is secured to the upper surface of the template 100, to permit manipulation of the template to adjust its angular position.

A knob 118 is secured to the upper surface of the cover 86, to be grasped when the cover is to be moved, to permit it to be swung up to permit the insertion or removal of the program sheet, and to permit it to be closed.

A pair of numbered dials 120 and 121, with movable pointers 122 and 124, respectively, are disposed in the two opposite lower corners of the cover respectively, referring to FIG. 1, to permit a student, who is using the machine, to keep track of the tricks that have been won by both sides. Appropriate indicia is imprinted on each dial to identify it.

The cover is also formed with a generally rectangular opening 126, that is disposed to be in registry with the program identification indicia 85 on the program sheet. The cover is also formed with a similar, generally rectangular opening 128 that is disposed to be in registry with the indicia 87 on the program sheet that provides miscellaneous information about playing conditions and the like.

Referring now to FIG. 2, a leaf spring 130 is secured to the lower surface of the cover 86. This spring is normally generally U-shaped in cross section, and is secured at its center portion to the cover 86 by a fastener 131. The arms of the springs are disposed, respectively, so that the upper arm 132 can engage against the foil section 82 of a program sheet that is inserted in the machine, when the cover is in its closed position, and so that the lower arm 134 projects through the rectangular opening 61 in the program sheet, and engages against the conductive layer 20 on the base 11. The function of the spring 130 is to provide electrical contact between the foil section 82 of the program sheet and the conductive layer 20 of the base of the machine.

To make a program sheet that is properly coded for use in the machine, a program sheet is prepared that is complete except for the holes 84. This sheet is inserted in the machine, on the base 11, and beneath the cover 86. The sliders 94 are moved substantially to the positions in which they are shown in FIG. 1, that is, with the sliders in the West and East positions moved away from the template, so that the playing card indicia are covered and the sequence numbers are exposed; and with the sliders in the South and North positions moved to expose the playing card indicia and to cover the numerical coded indicia 75 and 76 respectively. The program is then coded into the program sheet, to indicate the sequence of play that is best, in the opinion of an expert at contract bridge. The template 100 is the adjusted in position so that the arrows 112 and 114 each point to the numbers "1" that are imprinted on diametrically opposed parts of the upper retainer ring 101.

From the program that has been decided upon by the expert, the sequence of play for the first card in each of the North and South positions is then determined. For example, with the program sheet that is illustrated, the lead is from the West position, and as is shown in FIGS. 1 and 3, the lead card is the six of hearts. The next card to be played is the two of hearts, from the North position. At this point, the coder must exercise discretion, and assigns to the two of hearts an arbitrary code number that is shown in FIGS. 1 and 3 as being the number nine. This number is then imprinted on the program card in the proper location, beneath the indicia identifying the two of hearts. At the same time, a marking device is inserted in the hole, in the group of holes 110, that is identified by the number nine, to impress a mark on the metal foil 80.

The next card played is from the East position, and as shown in FIGS. 1 and 3, it is the nine of hearts. The next card played is from the South hand, and in accordance with the program, it is found that the card that should be selected is the King of Hearts. This card is also assigned an arbitrary code number that may be, for example, the number seven. Preferably, it is a number that is different than the one just used for the card played from West. A marking device is then inserted in the hole that is identified by the number seven, within the group of holes 111 in the template, to impress a mark on the foil 80.

The play is then continued in accordance with the predetermined program, and for each round or trick, the position of the template is advanced to bring the arrows 112 and 114 on the template into alignment with the number on the retaining ring 101 that corresponds to the trick number. The process of assigning code numbers for each of the playing cards in the North and South positions is continued, and the process of marking the foil 80 on the template is continued, always using the numbered hole that corresponds to the code number that is assigned to the particular card, and always using holes within the group 110 for the North position, and holes within the group 111 for the South position. When the marking process has been completed, the holes are punched in the program sheet and it is ready for use.

The same holes are used for a second program on the reverse side of the sheet. For this second program, the sequence of play of the cards from four hands, that are different from the four hands respectively of the first program, is again determined by an expert.

To assign code numbers to the cards in the North and South hands, the template 100 is adjusted so that the arrows 112 and 114 each point to the numbers "1" that are imprinted on diametrically opposed parts of the upper retaining ring 101. The code numbers for the first cards played from the North and South positions are determined by the template holes that line up with the holes that already formed in the program card. (This can be done by inserting the tip of the probe 40 in the template hole until the lamp 50 lights up.) The number that is associated with the template hole, in which the probe tip is inserted to light the lamp 50, is assigned to the card that is to be played.

The template 100 is then rotated until the arrows 112 and 114 point to the numbers "2" on the upper retaining ring, and the coding process is then continued until all of the cards in the North and South hands have been assigned code numbers.

As is clear from FIG. 3, it is impossible to determine, from an inspection of the program sheet itself, the sequence of play for the cards in the North and South position. The information is undecipherable to the observer and connot be retrieved from the program sheet except through use of the template.

The coding, of course, is done by the toy manufacturer, so that the student can buy a supply of coded program cards, all different, for use in a single machine.

To use the machine for simulating the play of a hand of contract bridge, a coded program sheet is placed in the machine on the base 11, beneath the cover. The sliders are moved so that the sliders in the West and East positions are remote from the template, to cover the playing card indcia, and so that the sliders in the North and South positions cover the code numbers but expose the playing card indicia. The sliders 96 are also adjusted in position so that they are closed, to cover the bidding sequence indicia. The play can then observe the indicia in the zone 86 that indicates the identity of the dealer and whether either side is vulnerable, and any other pertinent information that should be conveyed at this point.

For the particular program sheet that is illustrated, South is indicated to be the dealer by the abbreviation "D.S." in the indicia zone 87, and accordingly South makes the first bid. The student who is operating the machine then determines what bid the student thinks South should make, and if he wishes, may at once check his judgment against that of the expert, by moving the slider 96 in the South position to expose the programmed first bid, which the student would find to be one diamond. This process is continued around the board, with the student determining the bids made by East and West from the program sheet, and either bidding both North and South himself and checking his bids against those on the program sheet, or, alternatively, bidding only the South hand, keeping the playing card indicia in the North hand concealed, and determining the bids of the North hand only from the program sheet.

After the bidding, the template is set with the arrows 12 and 114 positioned to point to the numbers "1" on the retainer ring 101. West leads and West's order of play is that indicated by the sequence numbers. Accordingly, the first card played from the West position is the six of hearts. The student then selects one of the hearts from the North position of play. If the selection is the two of hearts, the slider is moved to cover the indicia representing the two of hearts and expose the code number for this card, which turns out to be the number nine. In order to determine whether or not this is the right card to be played in accordance with the program, the tip of the probe 40 is inserted in the hole numbered nine in the group of holes 110. Since the program card has been coded with a hole that was punched to be below the hole numbered nine in the template at this template setting, as can be seen from the view of the program card shown in FIG. 3, by the hole that is designated "9 North," the tip of the probe 40 passes through the code hole in the program sheet and engages against the surface of the conductive layer 18 on the base 11. This completes a circuit in the manner previously described, to energize the lamp 50, to inform the student that the correct card has been played in accordance with the program.

Should the student have selected some card other than the two of hearts, such as, for example, the eight of hearts, the student would expose the code number 13 on moving the slider to cover the indicia representing the eight of hearts. Upon checking, however, by inserting the tip of the probe 40 in the hole numbered thirteen in the group of holes 110, the student would engage the tip of the probe against the foil 80 on the program sheet. This would complete a circuit from the tip of the probe 40, through the foil 80, its extension 81, and its enlarged end section 82, through the arm 132 of the contact spring 130 to the other of its arms 134, through the conductive layer 20 on the base 11, the fastener 42, the bracket 41, the filament of the lamp 44, the line 45, the terminal clip 26, and the arm 36 of the terminal clip 26 to one terminal of the dry cell, and from the other terminal of the dry cell through the arm 35 of the clip 25, the clip 25, and the conductor 38, so that the lamp 44 is energized, to indicate to the student that the wrong selection has been made. Actually, the insertion of the probe in any of the holes in the group of holes 110, other than the hole numbered nine, will energize the "wrong" lamp 44, to inform the student that the wrong card selection has been made and that some other selection should be made, without, however, informing the student anything about the proper, programmed sequence of play for the card that has been improperly selected.

The third card play in the first trick is from the East position, and in accordance with the program sheet, is the nine of hearts. The next card played is from the South position, and if the student selects the King of Hearts, the code number 7 is exposed, as is shown in FIG. 1. To check his play, the student then inserts the tip of the probe 40 in the hole that is numbered seven in the group of holes 111. The probe passes through the hole that is identified in FIG. 3 as "7 South," and engages against the conductive layer 18 on the base 11, to complete a circuit to light the "right" light 50. The insertion of the probe in any of the other holes in the group 111 will resut in the engagement of the tip of the probe 40 against the foil 80 on the surface of the program sheet and will close a circuit to energize the "wrong" lamp 44.

The student continues to play the game, trick by trick, keeping track of the tricks, if desired, on the dials and with the pointers provided for the purpose on the cover.

The position of the template is adjusted for each trick, in order to bring the template arrows 112 and 114 into alignment with the numbers 115 on the retainer ring 101, and to align the template holes 110 and 111 respectively with the holes 84 in the program sheet.

A large number of different program sheets can be made up for use in the machine, to present new situations and new challenges to the student.

While the invention has been illustrated and described in connection with its use in a teaching machine for teaching the strategy and tactics of contract bridge, it is equally applicable to use in teaching a variety of other games, and other subjects. For general teaching, the multiple choice question and answer technique may be used. For example, a group of questions could be placed on a program sheet in the position corresponding to the West position for the program sheet that is illustrated, and a group of answers could be placed in the position corresponding to the North position. The actual number of answers in the group of answers in the North position could be the same as the number of questions at the West position, or could be considerably larger. The student would be expected to expose the questions, one by one, then make a selection of one answer from the group of answers in the North position. The machine would indicate whether the answer was right or wrong, but would not indicate to the student any correspondence between a particular answer selected that was not correct and one of the other questions.

The invention has been illustrated by a specific embodiment thereof, but it should be understood that many departures are contemplated from the specific structure that is illustrated. For example, the use of two lights is a refinement that is not essential, since the use of a single lamp, for either "right" or "wrong," would suffice to indicate whether a selection had been made that was in accordance with the program. The simplication of the machine, to use only a single lamp, can lead to substantial savings in manufacturing cost. For example, the program card 55 can be made up without the conductive foil 80, and all of the associated circuitry, of which the foil 80 was one element, including the lamp 44, can also be omitted. As thus modified, however, the machine can produce only a positive or "right" signal, and not a negative or "wrong" signal.

Moreover, instead of a lamp or lamps that can be energized, a buzzer or other kind of electrical signal could be used. Similarly, etched circuits suggest themselves readily for application to the present invention, as an alternative to the use of the laminate construction that is disclosed, in which metal foil is secured to heavy paper stock.

The term "indicia" is used in this application in a broad sense, as are similar words such as the term "imprinted" and the like. The purpose of the particular mechanical arrangement, that is disclosed in this application, is to indicate in some fashion whether or not a particular selection, that is made from several available choices, is in accordance with a predetermined program. The means for obtaining this indication can be selected from a variety of available alternatives, and the use of code holes is considered merely one form of indicia, for use in the particular mechanical arrangement disclosed. The use of appropriate printed circuitry would permit avoidance of the use of holes in the program card, but would require somewhat complicated circuitry. Similarly, the "indicia" need not be in the form of numerals or positioned holes, but may take the form of other symbols or their functional equivalents.

The term "value holding" is employed in some of the claims of this application to refer to a thing such as, for example, a playing card. This term is used in a broad sense since the invention may be employed in connection with other games, not necessarily card games, in which one contestant is pitted against another in a contest in which the end result may have no other meaning than the accumulation of more items, that have value for the sake of the contest, by one contestant than another; or the achievement of a superior position by one contestant.

The terms "question" and "answer" are also used broadly. For example, in a programmed game of contract bridge, as shown in the drawings, the cards played from the West and East hands can be considered as posing questions to the student, while the cards available for play from the North and South hands can be considered as possible answers to these questions.

While emphasis has been placed upon the use of the invention as a teaching machine, it is adaptable for use in contests between two or more persons or teams. For example, one player (or team) could be assigned to work with questions in the West position and answers in the North position, while the opponent would be assigned the East and South positions. The potential applications are many and can be varied by the use of suitable indicia and program sheets.

For some applications, the number of code holes in the template and the corresponding number of code numbers assigned to the "answers" can be reduced to be less than the total number of answers. Such a reduction is possible where there is no opportunity for confusion between two or more answers that are assigned the same code numbers.

While the inevntion has been disclosed herein by reference to the details of a preferred embodiment of the invention, therefore, it is nevertheless to be understood that such disclosure is intended in an illustrative, rather than in a limiting sense, and it is contemplated that various modifications in the construction and arrangement of the parts will readily occur to those skilled in the art, within the spirit of the invention and the scope of the appended claims.

I claim:

1. In a programmed device for teaching a card game, said device including means for presenting an array of card holdings for play in said game, means for selecting said card holdings to determine the sequence for play of said card holdings, and means for indicating the correctness of play of each of said card holdings in said selected sequence, the improvement comprising:
   (a) differential code indicia corresponding to each of said selectable card holdings;
   (b) a test location member having ap lurality of test stations each of which is marked with said code indicia in correspondence with said card holding;
   (c) means for moving said test location member to a plurality of predetermined positions each of which corresponds to play of card holdings in said game;
   (d) testing means operable at any of said coded stations at any of said positions of said test location member for determining correctness of play; and
   (e) means located relative to said positions of said test location member and said coded test stations and responsive to said testing means for indicating the correctness of play of any of said selected card holdings without giving any information as to the play of any other card holdings.

2. The device of claim 1 wherein said test location member comprises a rotatable disc formed to define apertures that are indicia coded to comprise said test stations, and said testing means comprises a probe adapted to be placed in any one of said apertures.

3. The device of claim 2 wherein said indicating means comprises a card underlying said disc and punched relative to said coded test stations and said disc positions to allow said probe to extend through said card in testing at a predetermined one of said indicia coded test stations corresponding to the correct card holding for play in said game.

4. The device of claim 3 wherein said indicating means includes an electric lamp and a source of electromotive force and wherein said probe is adapted for selectively completing a circuit to said lamp in response to insertion of said probe through the predetermined one of said apertures which corresponds to said correct play of a card holding.

5. In a programmed device for teaching bridge, said device including means for selectively revealing card holdings and plays in hands of bridge, means for selecting card holdings for play from the hand of a dummy and from the hand of a player, and means for indicating the correctness of said selection, the improvement comprising:

(a) differential code indicia corresponding to each of said selectable card holdings;
(b) a movable element provided with apertures each of which is marked with indicia in correspondence with said card holding indicia;
(c) means for positioning said movable element in a plurality of positions corresponding to the tricks of a hand of bridge;
(d) programmed means underlying said movable element and punched for providing an opening in registry with a predetermined one of said apertures in said movable element at each of said positions;
(e) an electric signal lamp;
(f) a source of electromotive force;
(g)) circuit means for said lamp underlying said programmed means; and
(h) a probe adapted to be inserted through any of said apertures in said movable element for testing an indicia code corresponding to the one of said card holdings selected for play, said probe being adapted to extend through one of said openings in said programmed means to complete a circuit to energize said lamp whenever said tested indicia corresponds to the correct card holding for play.

6. The device of claim 5 wherein said movable element comprises a disc adapted to be angularly positioned in at least 12 positions.

7. The device of claim 6 wherein said programmed means comprises a punched card on which said card holdings are arranged.

8. The device of claim 7 including a pair of signal lamps for respectively indicating correct and incorrect play, and wherein circuit means is arranged on said programmed means whereby a circuit is completed to said incorrect indicating lamp whenever said probe engages said programmed means, and a circuit is completed to said correct indicating lamp whenever said probe extends through an aperture in said programmed means and engages said circuit means underlying said programmed means.

References Cited by the Examiner
UNITED STATES PATENTS

| | | | |
|---|---|---|---|
| 2,181,925 | 12/1939 | Spiro | 35—8.2 |
| 2,193,745 | 3/1940 | Sterne | 35—8.2 |
| 2,226,973 | 12/1940 | Grigsby | 35—8.2 |
| 2,507,215 | 5/1950 | Miltenberg et al. | 35—9 |
| 2,545,381 | 3/1951 | Prentice | 35—9 |
| 2,943,400 | 7/1960 | Griswold | 35—9 |
| 3,057,082 | 10/1962 | Wellingten et al. | 35—48 |
| 3,089,255 | 5/1963 | Thompson | 35—9 |
| 3,100,352 | 8/1963 | Boissevain | 35—9 |
| 3,106,027 | 10/1963 | Thelen | 35—9 |

EUGENE R. CAPOZIO, *Primary Examiner.*

LAWRENCE CHARLES, *Examiner.*